Dec. 27, 1955
H. GLICKER
2,728,467
PARKING TOWER STRUCTURE
Filed Jan. 28, 1954
2 Sheets-Sheet 2
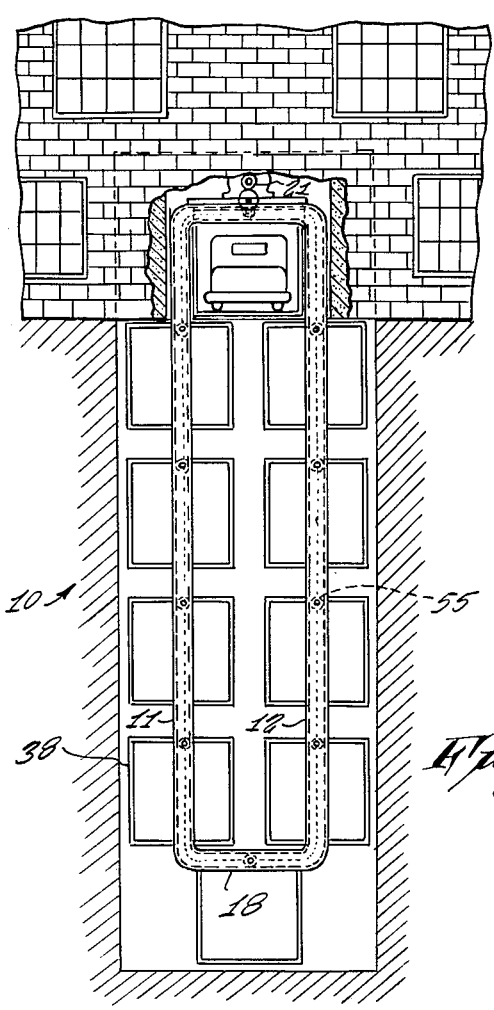
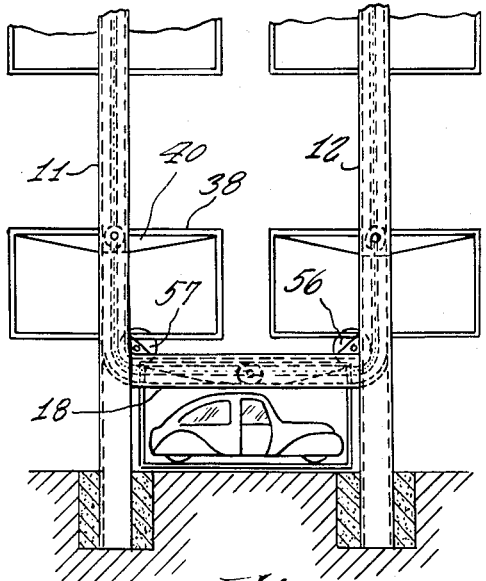
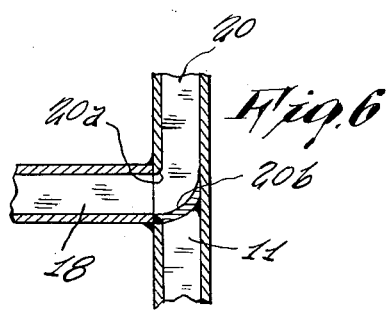
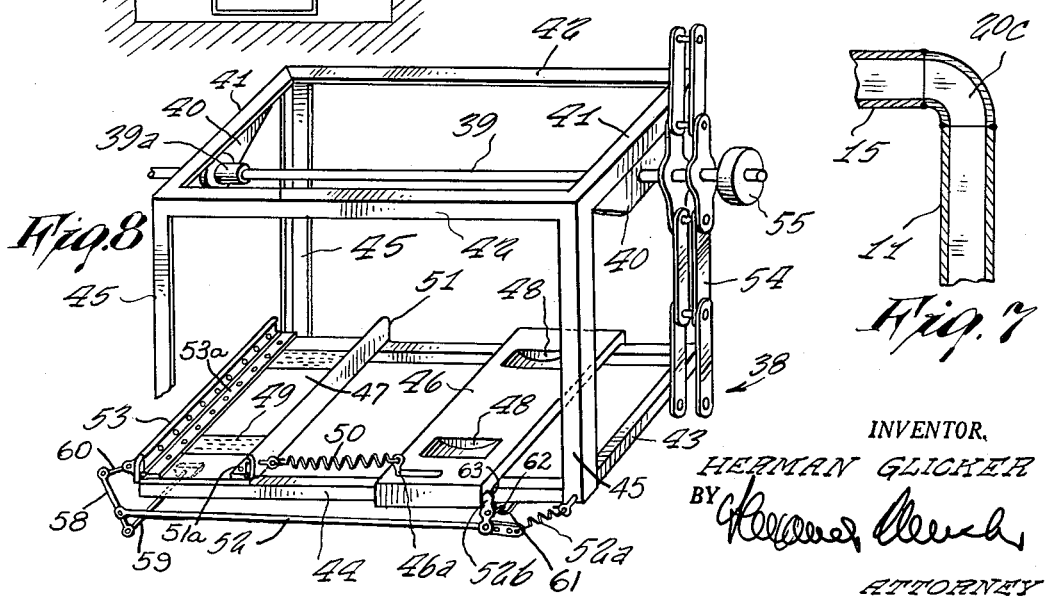
INVENTOR.
HERMAN GLICKER
BY
ATTORNEY

United States Patent Office 2,728,467
Patented Dec. 27, 1955

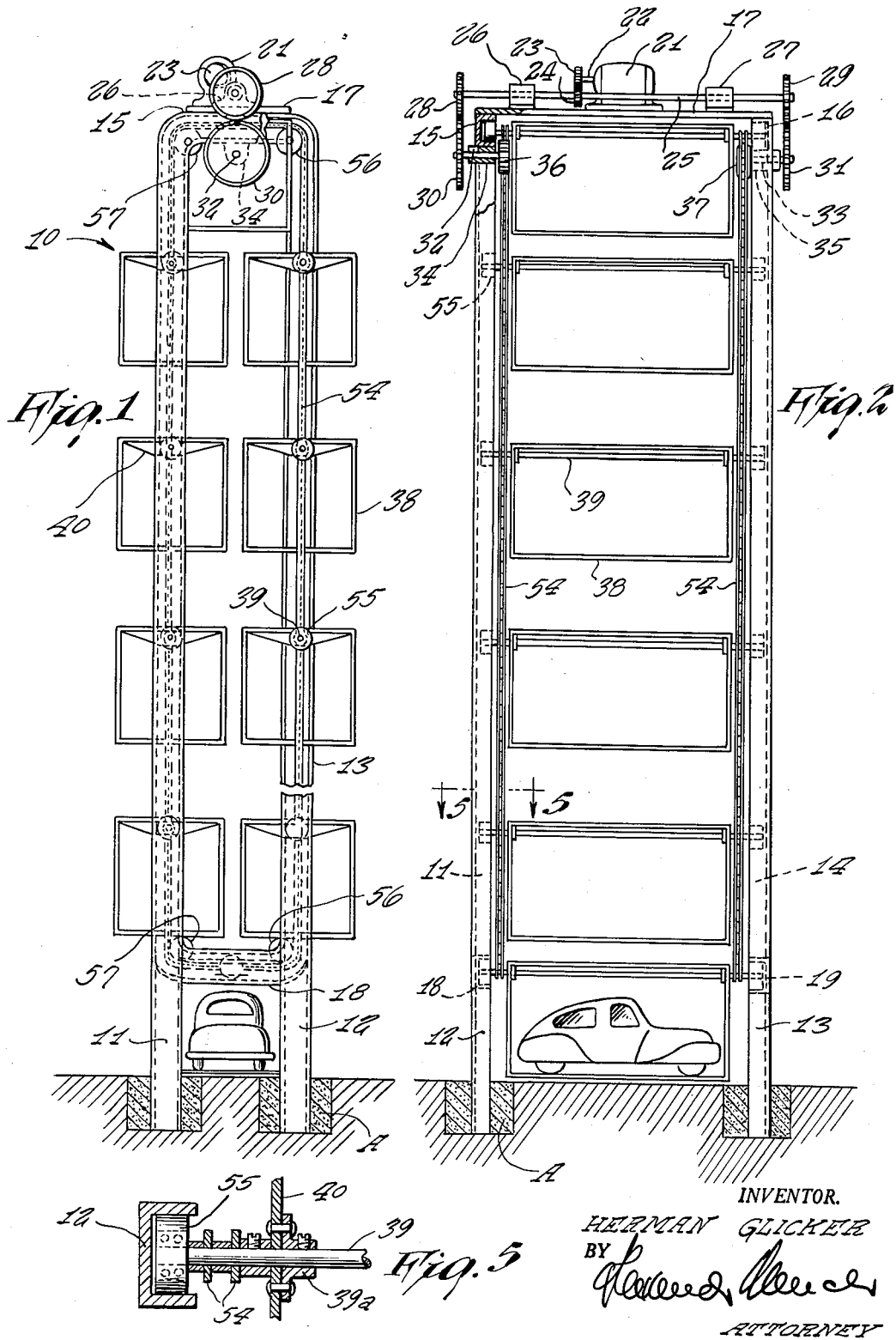

2,728,467

PARKING TOWER STRUCTURE

Herman Glicker, Flushing, N. Y.

Application January 28, 1954, Serial No. 406,815

2 Claims. (Cl. 214—16.1)

This invention relates generally to parking structures for vehicles such as motor cars and trucks, but more specifically to vertically disposed endless conveyors having storage cages secured therebetween, said cages being mounted on wheels within endless tracks running parallel with said conveyors.

The main object of the invention resides in the provision of a vertically disposed framework in the form of a shaftway in which a plurality of spaced parking cages are suspended at intervals between a pair of endless conveyor chains or cables, the chains being mounted on cage axles with axle wheels riding in guide rails afforded by the framework.

Another object of the invention resides in the provision of a vehicle parking tower having rotary means for conveying cages disposed in tiers, the said cages having axle wheels supported by and travelling in endless guide rails.

A further object of the invention resides in the provision of a parking tower wherein the individual parking cages are rideable between guide rails forming part of the framework and wherein each cage is capable of being raised and lowered to a position coplanar with the loading and unloading platform.

A further object of the invention resides in the provision of a parking tower wherein each of the cages is provided with means for guiding the car or vehicle into proper position within the cage for loading and for fixing the car in position for storage.

A further object of the invention resides in the provision of a parking tower structure which is efficient in operation and suitable for congested areas where ground space is not available.

Another object of the invention resides in the provision of a parking structure which is simple in construction, inexpensive in cost and maintenance and expeditious in operation.

These objects and other incidental ends and advantages of the invention will hereinafter appear in the progress of the disclosure and as will be pointed out in the appended claims.

Accompanying this specification are drawings showing preferred forms of the invention wherein:

Figure 1 is a front view in elevation, partly broken away, of the framework of the parking structure extending vertically from the ground and showing the individual compartments or cages and driving means therefor, the said view also showing a vehicle supported on the lowermost cage co-extensive with the loading platform.

Figure 2 is a side view in elevation of Figure 1.

Figure 3 is a front view in elevation partly broken away showing the parking structure disposed in a shaft below the ground level of a building with the loading and unloading platform at ground level.

Figure 4 is a fragmentary side view in elevation of the parking structure where the columns of the framework are spaced for loading laterally instead of centrally.

Figure 5 is an enlarged sectional view taken along the plane 5—5 of Figure 2.

Figure 6 is an enlarged fragmentary sectional view of each of the bottom cross members of the parking framework.

Figure 7 is an enlarged fragmentary sectional view of each of the top cross members of the framework.

Figure 8 is an enlarged view in perspective partly broken away showing one of the cages and the guiding and locking mechanism therein.

In accordance with the invention, the framework of the parking structure generally indicated by numeral 10 is comprised of a pair of similar, spaced and parallel opposing frames suitably joined together. One of the frames has a pair of upright channels 11 and 12 joined at the top by a communicating cross channel 15 and adjacent the bottom by a communicating cross channel 18. The other frame has upright channels 13 and 14 joined at the top by a communicating cross channel 16 and adjacent the bottom by a communicating cross channel 19. These frames as shown are joined at the top as by a bracing member 17. Other braces between said frames may be utilized if desired.

As seen in Figure 6, the lower cross channel 18 at the ends joins vertical channels 11 and 12 by suitable welding at a cutout 20a in the inner walls of said channels 11 and 12. A curved plate 20b is secured to the base 20 of channels 11 and 12 to cause a communication between the channels 11 and 12 and the lower cross channel 18. Cross channel 19 is similarly secured between vertical channels 13 and 14.

As seen in Figure 7, the top cross channel 15 is secured to vertical channels 11 and 12 by an elbow channel member 20c. Similarly channel 16 is secured to vertical channels 13 and 14. Thus there results a pair of spaced and opposing continuous tracks. The lower ends of the vertical channel members 11, 12, 13 and 14 as seen in Figures 1, 2, and 4 may be anchored in concrete bedding as indicated by the letter A.

Located on the top bracing 17 is a motor 21 provided with a drive shaft 22 and a driving gear 23 which engages a gear 24 mounted on a transmission cross shaft 25. Shaft 25 is journaled in supports 26 and 27 mounted on bracing 17 and carries at each end a gear 28 and 29 disposed beyond each of the parallel frames. A pair of gears 30 and 31 driven and engaged by gears 28 and 29 are secured at the outer ends of shafts 32 and 33 which are journalled in supports 34 and 35 secured to the under face of the lower wall intermediate the top cross channel members 15 and 16. The inner ends of shafts 32 and 33 terminate in gear wheels 36 and 37 which are disposed inwardly of the side walls of channels 15 and 16. Gear wheels 36 and 37 serve to drive the endless chains to which the individual storage cages are secured as will hereinafter appear.

Mounted between the channels of each of the frames are a plurality of spaced cages or platforms generally designated by numeral 38 to receive a vehicle. The number of cages or platforms employed depends upon the height or depth of the structure. As seen in Figure 8, each cage is mounted on an axle 39 which extends through and is secured as by a flanged bushing 39a to a pair of side plates 40 which are affixed to the cross angles 41 of a top frame having longitudinal angles 42. The bottom frame for the cage consists of side angles 43 and longitudinal angles 44, the top and bottom frames being joined together by corner vertical angles 45.

On the bottom frame of each cage is a guiding and locking platform to receive the vehicle for loading so that it will not overshoot the limits of the platform and to lock the vehicle in place during rotation of the cage. Thus a forward plate 46 is slidably mounted on longitudinal angles 44 of the bottom frame, while a rear and parallel plate 47 is affixed to the angles 44. The forward plate 46 is provided with wells 48 to receive the front wheels of the vehicle while the rear plate 47 is provided with non-skid or safety tread portions 49. Plates 46 and 47 are normally held together when in non-operative position in abutting relation by the compressive force of coil spring 50. Spring 50 has one end anchored to plate 46 as at lug 46a affixed thereto by a brazed or welded arm while the opposite end is secured to a wall 51 provided with a 90 degree hinge 51a secured to plate 47. Wall 51 normally lies flat along plate 47 as when the plates 46 and 47 are drawn together upon withdrawal of a vehicle rearwardly of plate 46, due to the spacing of spring 50 when in normal and compressed condition. A wall 53 on the forward transverse edge of plate 47 is pivoted thereto by a hinge 53a and is secured to a lever arm 52 for maintaining flat and vertical position thereof. Thus lever arm 52 at the forward end is connected at an intermediate point with a link 58, the bottom of link 58 being pivoted on an axle 59 supported on the underside of plate 47. The upper end of link 58 is connected to wall 53 by means of a link 60. The opposite end of lever arm 52 is connected to a vertical angle 45 by means of a normally expanded coil spring 52a to maintain wall 53 in flat position. Adjacent to spring 52a and pivoted to arm 52 at the lower end is a link 52b. Link 52b at an intermediate position rotates on an axis 61 mounted in a slot 62 on the underside of angle 44 and has an upwardly projecting finger 63 adapted to engage the opposing edge of the plate 46 when a car is in storage position. Thus, when cage 38 has been emptied, the force of spring 50 causes a movement of plate 46 toward 47 and backward folding of wall 51 by compression space of spring 50. In addition and at this time spring 52a exerts an expansive force against lever arm 52 forcing wall 53 into flat position by disengagement between finger 63 and the opposite transverse edge of plate 46. Thus a vehicle is permitted to enter on the plates 47 and 46 when drawn together. When the front wheels of the vehicle enters wells 48, plate 46 is forced with the vehicle movement against the action of spring 50, while walls 51 and 53 assume an upright position thereby causing a locking of the rear wheels therebetween as shown in Figure 8.

The projecting ends of each of the axles 39 are secured to corresponding link chains 54 and are further provided with terminal rollers or wheels 55 which roll in the continuous passageways afforded by the channels of the framework. The chains engage the driving gears or sprockets 36 and 37 in conjunction with pairs of upper and lower idlers designated by numerals 56 and 57.

The cages are rotatable and as seen in Figures 1 and 2, vehicles may be driven in from the street level through one of the arches afforded by the channel frames to be guided and locked into the platform which is on ground level. Thereafter the device is rotated to allow another car to engage another cage.

When it is desired to load and empty the cages it is merely necessary to start the motor 21 and allow the link chains 54 to move in either direction until the particular cage is in correct position for loading or unloading. It is to be noted that the weight of the cages is supported by the upper cross channels 15 and 16 except for the lowermost cage which is supported by the lower cross channels 18 and 19.

In Figure 3 is illustrated an arrangement wherein the framework is disposed in a shaft and suspended from an anchorage at the ground level of a building of which the upper stories may be used in the conventional manner. In Figure 4 the spacing of the vertical channels is varied to provide a lateral approach to the platform of the cage.

I wish it understood that minor changes and variations in the integration, location, duplication, material and size of parts may all be resorted to without departing from the spirit of the invention or the scope of the appended claims.

The parking device above described may be temporary or permanent and may be constructed either in conjunction with a building or without. In the event that the parking structure forms one or more shaftways in conjunction with buildings, then the parking facilities are independent of the building facilities. Moreover, a plurality of such devices may be erected adjacent each other for conservation of space.

Although no safety devices have been incorporated in the above description, it is understood that the conventional means used for lifts are adaptable.

I claim:

1. In an apparatus of the character described, a pair of endless and vertically disposed spaced conveyors, a series of storage cages between said conveyors, cross-members penetrating and being secured to said conveyors and having guide wheels journalled at the ends thereof, said cages being suspended from said cross-members, a pair of spaced and joined frames to support the apparatus having continuous tracks spaced from and parallel with said conveyors and in which only said guide wheels are disposed and ride, means for driving and supporting said conveyors mounted on said frames, and guiding and locking means on the platform of each cage for receipt of a vehicle therein at the bottom of the run of the conveyors and comprising a fixed plate, a relatively slidable and spring urged plate, the latter having a pair of wells for the front wheels of the vehicle and being adapted to force said slidable plate forwardly when the wells are engaged by the front wheels of the vehicle, a stop for the maximum forward movement of the slidable plate.

2. In an apparatus of the character described, a pair of endless and vertically disposed spaced conveyors extending downwardly in a shaft, a series of storage cages between said conveyors, cross-members penetrating and being secured to said conveyors and having guide wheels journalled at the ends thereof, said cages being suspended from said cross-members, a pair of spaced and joined frames extending downwardly in the shaft to support the apparatus and having continuous tracks spaced from and parallel with said conveyors and in which only said guide wheels are disposed ride, means for driving and supporting said conveyors mounted on said frames, and guiding and locking means on the platform of each cage for receipt of a vehicle therein at the top of the run of the conveyors, and comprising a fixed plate, a relatively slidable and spring urged plate, the latter having a pair of wells for the front wheels of the vehicle, the said wells when engaged by the front wheels of the vehicle causing a forward movement of the slidable plate, and a forward stop for the said slidable plate.

References Cited in the file of this patent

UNITED STATES PATENTS

| | | |
|---|---|---|
| 1,799,924 | Muzyn | Apr. 7, 1931 |
| 1,816,053 | McGavin | July 28, 1931 |
| 1,857,431 | Clark | May 10, 1932 |
| 1,887,245 | Murray | Nov. 8, 1932 |